US006978930B2

(12) United States Patent
Harding et al.

(10) Patent No.: US 6,978,930 B2
(45) Date of Patent: Dec. 27, 2005

(54) OPTICAL BAR CODE SCANNER AND SYSTEM FOR RETRIEVING BAR CODE DATA

(75) Inventors: Kyle D. Harding, North Attleboro, MA (US); Keith Hoyes, Welwyn Garden City (GB); Ian Quick, Richmond (AU)

(73) Assignee: A.T.X. International, Inc., Lincoln, RI (US)

(*) Notice: Subject to any disclaimer, the term of this patent is extended or adjusted under 35 U.S.C. 154(b) by 0 days.

(21) Appl. No.: 10/600,108

(22) Filed: Jun. 20, 2003

(65) Prior Publication Data

US 2004/0079804 A1 Apr. 29, 2004

Related U.S. Application Data

(60) Provisional application No. 60/390,372, filed on Jun. 21, 2002.

(51) Int. Cl.⁷ ............................................. G06K 15/00
(52) U.S. Cl. .................. 235/383; 235/375; 235/462.01
(58) Field of Search ............................. 235/375–383, 235/462.01–49; 705/10, 16, 26

(56) References Cited

U.S. PATENT DOCUMENTS

| | | | | |
|---|---|---|---|---|
| 4,654,482 | A | 3/1987 | DeAngelis | 379/95 |
| 5,157,687 | A | 10/1992 | Tymes | 375/1 |
| 5,221,838 | A | 6/1993 | Gutman et al. | 235/379 |
| 5,280,498 | A | 1/1994 | Tymes et al. | 375/1 |
| 5,288,976 | A | 2/1994 | Citron et al. | 235/375 |
| 5,349,678 | A | 9/1994 | Morris et al. | 395/800 |
| 5,424,524 | A | 6/1995 | Ruppert et al. | 235/462 |

(Continued)

FOREIGN PATENT DOCUMENTS

EP 0 837 406 A2 4/1998

(Continued)

OTHER PUBLICATIONS

Dean et al. *IBM Technical Disclosure Bulletin*, 35(1A):315-318 (1992).

Primary Examiner—Thien M. Le
Assistant Examiner—Kimberly D. Nguyen
(74) Attorney, Agent, or Firm—Mintz, Levin, Cohn, Ferris, Glovsky and Popeo, P.C.

(57) ABSTRACT

A shopping system for scanning codes related to products, such as consumer goods and services, and for retrieving data associated with the codes includes a portable, hand-held and battery-operated optical code scanner for scanning, capturing, storing and decoding information related to scanned codes, at least a first shopping kiosk having a processor, and at least a first host computer operatively coupled to the first shopping kiosk. The scanner and the first shopping kiosk are configured such that the scanner transfers decoded data to the kiosk, and the kiosk provides the transferred decoded data in a useable format by means of a display monitor and/or a printer. A communications data link between the scanner and the first shopping kiosk is established for transfer of decoded data by a transfer, and recognition by the first shopping kiosk and/or the first host computer, of an identification code stored in memory of the scanner that is associated with a user of the scanner and/or the scanner. Upon receipt and recognition of the transferred decoded data and/or the identification code, the first host computer selects and retrieves stored information associated with the decoded data and/or the identification code that is relevant to, for instance, scanned items and shopping preferences and needs of the identified user. Such retrieved information is downloaded to the first shopping kiosk to provide such information to the identified user in a useable format.

26 Claims, 5 Drawing Sheets

U.S. PATENT DOCUMENTS

| | | | | |
|---|---|---|---|---|
| 5,468,947 | A | 11/1995 | Danielson et al. | 235/472 |
| 5,490,217 | A | 2/1996 | Wang et al. | 380/51 |
| 5,600,833 | A | 2/1997 | Senn et al. | 395/601 |
| 5,635,694 | A | 6/1997 | Tuhro | 235/375 |
| 5,640,193 | A | 6/1997 | Wellner | 348/7 |
| 5,804,803 | A | 9/1998 | Cragun et al. | 235/375 |
| D406,581 | S | 3/1999 | Bhatia et al. | D14/116 |
| 5,905,251 | A | 5/1999 | Knowles | 235/472.01 |
| 5,978,773 | A | 11/1999 | Hudetz et al. | 705/23 |
| 6,081,629 | A * | 6/2000 | Browning | 382/313 |
| 6,134,548 | A | 10/2000 | Gottsman et al. | 707/5 |
| 6,175,922 | B1 * | 1/2001 | Wang | 713/182 |
| 6,820,808 | B2 * | 11/2004 | Mehler | 235/454 |
| 2002/0042774 | A1 * | 4/2002 | Ortiz et al. | 705/39 |
| 2002/0104887 | A1 * | 8/2002 | Schlieffers et al. | 235/472.02 |
| 2004/0212504 | A1 * | 10/2004 | Forcier et al. | 340/572.1 |

FOREIGN PATENT DOCUMENTS

| | | |
|---|---|---|
| WO | WO 97/01137 | 1/1997 |
| WO | WO 98/03923 | 1/1998 |
| WO | WO 98/06055 | 2/1998 |
| WO | WO 98/19259 | 5/1998 |
| WO | WO 98/20411 | 5/1998 |
| WO | WO 98/24036 | 6/1998 |
| WO | WO 99/14705 | 3/1999 |
| WO | WO 00/05668 | 2/2000 |

* cited by examiner

TABLE 1

| Code 128 | ISBN+5 | |
|---|---|---|
| EAN 128 | ISSN | UPCA |
| Codebar | ISSN+2 | UPCA+2 |
| EAN 13 | ISSN+5 | UPCA+5 |
| EAN 13+2 | ITF | UPCE |
| EAN 13+5 | JAN-13 | UPCE+2 |
| EAN 8 | JAN-13+2 | UPCE+5 |
| EAN 8+2 | JAN-13+5 | Plessy |
| EAN 8+5 | JAN-8 | Code 39 |
| ISBN | JAN-8+2 | DCCI Slant 128 |
| ISBN+2 | JAN-8+5 | |

Fig. 3

OPTICAL BAR CODE SCANNER AND SYSTEM FOR RETRIEVING BAR CODE DATA

This application claims priority under 35 U.S.C. §119(e) to U.S. provisional patent application Ser. No. 60/390,372 filed on Jun. 21, 2002.

FIELD OF THE INVENTION

The invention relates to a scanner and a system for retrieving scanned bar code information.

BACKGROUND OF THE INVENTION

Optical readers and laser scanners used for reading and decoding bar code symbols to extract useful information are known. Many code readers and scanners are used to read known symbologies, such as UPC, EAN, JAN and similar codes, to provide information typically retrieved by converting such code symbols with data processing and computing devices. Optical readers and laser scanners are used in a variety of different information collection applications, and are often used in conjunction with point-of-sale systems. Such systems typically make code readers and scanners available to consumers for self-service and self-checkout activities on a temporary basis, while consumers are present at a retailer site. In many instances, such code readers and scanners, particularly laser scanners, are portable, hand-held devices having dimensions similar to hand-held electrical tools that can be, in many instances, bulky and difficult to manipulate manually during scanning of bar codes printed on articles. In addition, laser scanners can be relatively expensive due to manufacturing costs and costs associated with regulatory compliance of laser scan engines.

It is desirable to use bar code symbologies for retrieval and management of different types of information due to the standardized coding technologies available and the ease with which bar code data can be retrieved. Therefore, it is desirable to provide an optical bar code scanner that is inexpensive and economical for any consumer to purchase and to own for his/her personal use in a variety of different applications. It is also desirable to provide a bar code scanner having certain properties whereby the scanner, like a credit card or an ATM card, can identify a consumer to a data processing or computing system to not only retrieve bar code data, but to identify a consumer to the system for further applications.

SUMMARY OF THE INVENTION

In general, in an aspect, the invention provides a shopping system for scanning codes related to products and for retrieving data associated with the codes comprising a battery-operated personal code scanner having a size and a shape such that the scanner is hand-held, the scanner including a light source for projecting a light from the scanner to the code to be scanned, an optical sensor for detecting light reflected from the code and for generating an electrical signal in response to detecting the reflected light, a microcontroller for decoding the electrical signal to decoded data, memory operatively coupled to the microcontroller for storing the decoded data and at least one identification code to identify a user of the scanner, the identification code being unique to the scanner and a user, and an infrared emitter operatively coupled to the microcontroller for transferring the identification code and the decoded data from the scanner by infrared communication. The shopping system further includes at least a first shopping kiosk for receiving the decoded data from the scanner including a processor and an infrared receiver, the infrared receiver being configured by an application program used by the processor to enable the infrared receiver to receive the identification code by infrared communication and, upon the processor recognizing the identification code, to establish a communications data link with the scanner such that the infrared emitter can transfer the decoded code to the infrared receiver. The shopping system also includes at least a first host computer operatively coupled to the first shopping kiosk, the first host computer and the first shopping kiosk being configured to enable a two-way communications link between the first host computer and the first shopping kiosk, the first host computer including a processor and memory, the processor being configured with one or more application programs to receive the decoded data from the first shopping kiosk through the communications link and to identify information related to the decoded data, wherein, in response to identifying the information related to the decoded data, the processor selects and retrieves stored information from the memory and transmits the retrieved information to the first shopping kiosk through the communications link, and the first shopping kiosk provides the retrieved information in a useable format.

Implementations of the invention may include one or more of the following features. The retrieved information includes at least one of pricing information, product features and benefits information, nutritional information, special offer information, location information, delivery information, related and similar products information, information related to decoded data the first host computer previously received, and any combination thereof. The first shopping kiosk further includes means for providing the decoded data transferred from the scanner in a useable format. The first shopping kiosk further includes means for providing the retrieved information transmitted from the first host computer in a useable format. Means for providing one of the transferred decoded data and the retrieved information in a useable format includes a printer operatively coupled to the first shopping kiosk to provide at least one of the transferred decoded data and the retrieved information in a readable format as printed text. Means for providing one of the transferred decoded data and the retrieved information in a useable format includes a display monitor operatively coupled to the first shopping kiosk to provide at least one of the transferred decoded data and the retrieved information in a readable format as displayed text.

Implementations of the invention may also include one or more of the following features. The first shopping kiosk further includes memory to store the transferred decoded data. The first shopping kiosk is further configured to provide the transferred decoded data in a useable format in response to identifying the identification code. The processor of the first host computer is further configured with one or more application programs to receive the identification code from the first shopping kiosk through the communications link, and to identify a user associated with the identification code. The processor of the first host computer is further configured such that, in response to identifying a user associated with the identification code, the first host computer selects and retrieves stored information associated with the identified user from the memory and transmits the retrieved information to the first shopping kiosk through the communications link, and the first shopping kiosk provides the retrieved information in a useable format. The retrieved information associated with the identified user includes at least one of information describing the user's personal buying history, information related to the user's preferences, information related to the user's product selections, information related to products similar to the user's product selections, and any combinations thereof. The first host computer is operatively coupled to one or more databases configured to store and to manage at least one of the information related to the decoded data and the information associated with the identified user.

Implementations of the invention may further include one or more of the following features. The first shopping kiosk is operatively coupled to a local area network of multiple shopping kiosks. The processor of the first shopping kiosk is further configured to transmit the decoded data transferred from the scanner through the local area network to a second shopping kiosk, wherein the second shopping kiosk receives the decoded data and provides the decoded data in a readable format. The first host computer is operatively coupled to the local area network and its processor is further configured to transmit the decoded data transferred from the first shopping kiosk through the local area network to one or more shopping kiosks. The local area network is operatively connected to the Internet, and at least one of the processor of the first shopping kiosk and the processor of the first host computer is further configured to transmit decoded data through the Internet to a second host computer. The processor of the first shopping kiosk processor is further configured to provide one or more local functions to the first shopping kiosk to permit user access to the decoded data transferred from the scanner to the first shopping kiosk. The one or more local functions of the first shopping kiosk permit a user to format the decoded data into a product order and to transmit the product order from the first shopping kiosk through the Internet to the second host computer for order fulfillment. The identification code includes information related to at least one of the user and the scanner.

Implementations of the invention may still further include one or more of the following features. The scanner is further configured having a size and a shape to serve as a key fob. The scanner further comprises a manually operated trigger disposed in the housing and configured to activate the scanner to perform one or more functions. The scanner further comprises a lens disposed in the housing with at least a portion of the lens protruding from a terminal end of the housing to permit the portion of the lens to serve as a contact scanning tip, the lens being further disposed and being configured to permit light generated by the light source to shine from the scanner and to receive light reflected from the code. The scanner further comprises an indicator light disposed in the housing and configured with a light source to generate one of a static light beam and a flashing light beam to indicate one or more functions of the scanner. The microcontroller is further configured to use an application program stored in the memory to enable the scanner to decode one or more types of codes in response the microcontroller decoding a scanned control code associated with instructions to decode the one or more types of codes. The microcontroller is further configured to use an application program stored in the memory to enable the scanner to perform one or more functions in response to the microcontroller decoding a scanned setting code associated with instructions to perform the one or more functions. The one or more functions of the scanner include the scanner providing an indication a code was scanned twice.

Various aspects of the invention may provide one or more of the following advantages. A hand-held, battery-powered optical contact scanner can be provided for scanning, decoding and storing bar code symbols, as well as other information symbols, codes and characters, including, for example, EAN, UPC and JAN bar codes printed on or affixed to various articles. The scanner can provide a safe and an economical contact scan engine for optically scanning bar code symbols, eliminating the safety risks and reducing the manufacturing and regulatory compliance costs associated with laser scan engines. The scanner can be constructed of lightweight materials and can have a size and a shape to provide a pocketsize scanner that is easily transportable in a user's pocket or handbag and is readily available for scanning bar code symbols. The scanner can thereby serve as a highly portable manual scan engine for optically scanning bar code symbols in any location. The scanner can be further configured either as a key fob or a key chain such that keys and other personal items can be attached to the scanner.

The portable scanner can be configured with memory to store data decoded from scanned bar code symbols, and can be configured with a microprocessor to optically transfer decoded data by infrared communication to a central processing unit or other computing device, such as a computer, a personal digital assistant, an Internet access device or other interface device. A microprocessor of the scanner can operate an application program for infrared communication, and can configure an infrared emitter disposed in the scanner to transfer or upload decoded data as an infrared data stream to a compatible infrared receiver of a computer. The scanner can thereby transfer or upload decoded data to the computer, and the computer can retrieve information decoded from scanned bar code symbols by providing such information in a readable and useable format. For example, a computer can provide scanned bar code symbol information as a displayed or printed text.

The scanner can be multifunctional via a customizable memory configured and managed by firmware commands of the microprocessor, and can include different fixed and user-modifiable settings to control and to enable/disable various parameters, functions and operations of the scanner. The memory of the scanner can include at least one identification code that is associated with an authorized or otherwise designated user of the scanner. The identification code serves to uniquely identify a user of the scanner to a computer, and to provide the user with immediate access to the computer and its functions. The computer can be configured by applications software to recognize the identification code and, in response to recognition of the identification code provide a communications data link between the scanner and the computer. In one embodiment, the scanner and the computer are configured to transfer the identification code and decoded data from the scanner to the computer via a one-way infrared communications data link. The scanner can be used to transfer decoded data from the scanner memory to the computer by an infrared communication to retrieve the decoded data in a usable. The computer can thereafter process the transferred decoded data to make such data available to an identified user in a format for use independently of or in conjunction with the computer, including further processing of the decoded data and/or storage of the data for future use.

Recognition of the identification code can prompt the computer to selectively retrieve and provide to an identified user stored information and data files that it processes, manages and/or stores, which can be related to the identified user of the scanner and/or decoded bar code data transferred or uploaded to the computer. The stored information and data files the computer provides can be related to other information the computer processes, manages and/or stores based on the scanned bar code information received from the identified user.

A combination of the scanner and the computer can comprise a system for collecting and managing scanned bar code symbol information wherein the scanner serves to collect decoded data and the computer serves to store, decode and manage such data. A combination of the scanner and the computer can further comprise a system whereby the identification code provides an identified user with access to retrievable data files and other information stored by the computer that contain relevant or personal information related the identified user based upon either scanned bar code information or other information the computer processes and manages by various techniques and functions.

The combination of the scanner and the computer can be configured and arranged as a system for use in consumer shopping applications for collecting and managing bar code symbols used with consumer products and in related printed materials. Consumer convenience and ease in shopping applications can be provided by the system whereby a consumer can use the pocketsize scanner to scan, decode and store bar code symbols on merchandise, labels, packaging, and in printed advertisements, coupons and flyers for immediate or later transfer or upload to a computer to retrieve the scanned bar code information in a useable format suitable for shopping purposes. The scanner can help to provide convenience and accuracy in repurchasing or reordering items, such as grocery and food items. Transferring the identification code with the scanner to the computer can interface a consumer with certain functions the computer provides such as retrieving transferred decoded bar code information in a usable format, such as shopping lists, product orders and requests for additional information related to scanned items. The computer can be operatively connected to an intranet and/or the Internet such that shopping lists, product orders and requests for information can be transmitted from one site, such as a first retail store, to a second site, such as a second retail store where a list, order or request is fulfilled and delivered to a consumer. The scanner is configured such that it creates consumer shopping at home, as well as in a variety of other locations, and provides access to a computer that provides additional information related to scanned items, and marketing and sales information in connection with scanned and related items.

BRIEF DESCRIPTION OF THE DRAWINGS

FIG. 3 illustrates Table I indicating different types of codes the scanner shown in FIGS. 1–2 is configured to scan and to decode.

DETAILED DESCRIPTION OF THE PREFERRED EMBODIMENTS

Figure 1:
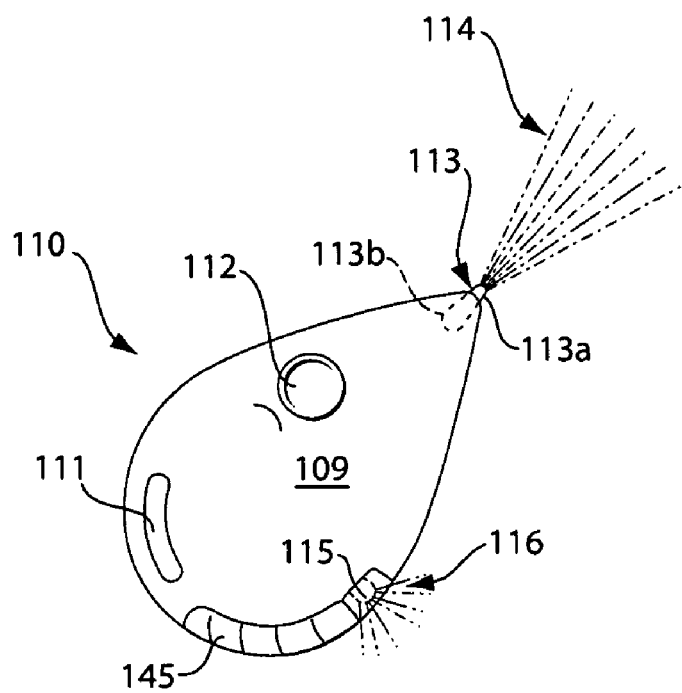
FIG. 1 is a top view of an optical bar code scanner according to one embodiment of the invention.

Referring to FIG. 1, a contact optical bar code scanner 110 for scanning, decoding, storing, transferring and retrieving information represented by bar code symbols and other information symbols, codes and characters is provided. The scanner 110 includes a housing 109 to contain electronics hardware and optical components that provide the scanner 110 with scanning, decoding, storing and communications/data transfer functions, a trigger button 112 disposed in an external surface of the housing 109 to activate operation of the scanner 110, an optical scanning tip 113 to facilitate scanning, and an indicator light emitting diode (LED) 115 to provide visual feedback, for example, of the status or mode of operation of the scanner 110.

The housing 109 has overall dimensions and construction to permit the scanner 110 to be used as a portable manual scanning device. The housing 109 is further configured and sized to contain, as noted, electronics hardware and optical and other components, while enabling the scanner 110 to fit easily in a user's hand and to be stored and transported in a user's pocket or handbag. In one embodiment, the scanner 110 has dimensions measuring from about 126 mm in length, about 36 mm in width and a thickness of about 12 mm. The scanner 110 is constructed of lightweight materials to enhance portability such that the scanner 110 can be used in a variety of locations. In one embodiment, the scanner 110 can weigh from about 10 to about 20 grams. In one embodiment, to enhance portability of the scanner 110, the scanner 110 includes one or more batteries, as described below in further detail, that provide the scanner 110 with power for operating in a wireless mode.

Referring further to FIG. 1, in one embodiment, the housing 109 can be sized and shaped to enable the scanner 110 to serve as a key fob or key chain. The housing 109 can define one or more holes 111 that facilitate attachment of one or more keys, a key chain, pocket-sized personal items and the like to the scanner 110.

The trigger button 112 is configured as a manually operated button and is disposed in a top surface of the housing 109 to permit ease of use. The trigger button 112 is manually depressed, e.g., by a user's finger, and released to activate the scanner 110 to different modes of operation and to initiate scanning, decoding, storing and communications/data transfer functions.

In one embodiment, the indicator LED 115 includes a 570 nm LED and a translucent or transparent window-like structure in the housing 109 constructed such that an indicator light 116 the indicator LED 115 generates, to indicate certain operations, modes and status of the scanner 110, can shine from the scanner 110 and provide a user with visual feedback. The indicator LED 115 is oriented in the housing 109 with respect to the trigger button 112 such that operation of the trigger button 112 does not interfere with the operation of the indicator LED 115 and the visual display of the indicator light 116. The indicator LED 115 is configured to emit or flash the indicator light 116 a number of times at a certain rate, e.g., a rapid rate or a periodic rate such as one flash per second, to provide an indication of, for instance, the status of a scanning operation or the type of function being performed.

Different embodiments of the scanner 110 according to the invention can include the indicator LED 115 configured to provide visual feedback for a number of different operations, functions and conditions of the scanner 110 and are not limited to those disclosed herein. For instance, in one embodiment, the indicator LED 115 is configured to emit or flash the indicator light 116 to indicate the status of certain operations of the scanner 110 including, but not limited to, a successful scan of a bar code, a successful scan of a parameter or control bar code, a successful decoding of a scanned code or a failure to decode, a scanned code is an unauthorized or invalid code or has a UPC or EAN extension, successful storage or deletion of a scanned code from memory, addition of a time stamp to a scanned code stored in memory, and a complete optical transfer of decoded data from the scanner 110.

In another embodiment, the indicator LED 115 can be configured to indicate operational conditions of the scanner 110 including, but not limited to, an indication that memory is empty, 90% full or full, power of the scanner 110 is reset and battery power is low. In another embodiment, as described below in further detail, the indicator LED 115 is configured to emit or flash the indicator light 116 to indicate establishment and operation of a communications connection, e.g., an infrared (IR) communications data link, between the scanner 110 and a computing device, e.g., a computer, a personal digital assistant or other interface device, for data transfer.

Figure 2:
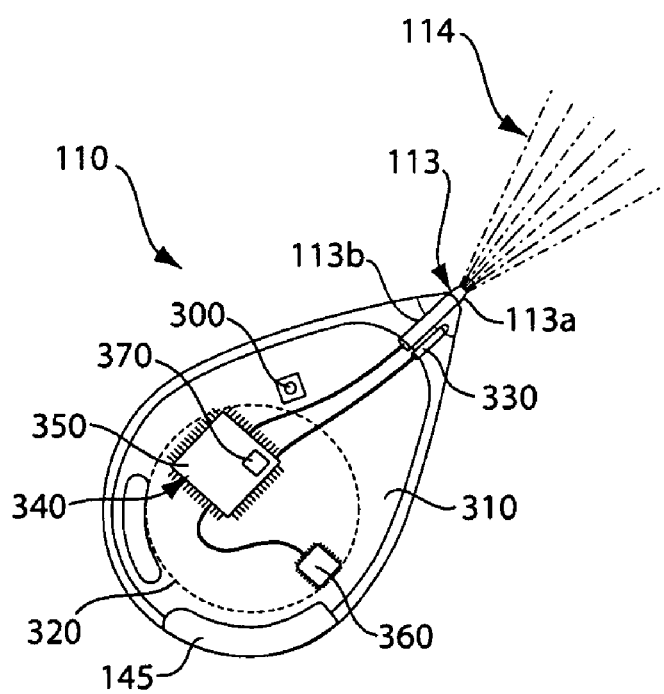
FIG. 2 is a top view of an internal configuration of the scanner shown in FIG. 1 with a top portion of a housing of the scanner removed.

Referring to FIG. 2, and with further reference to FIG. 1, the internal configuration of the scanner 110 includes integrated electronics hardware and optical components for various operations and functions including a trigger switch 300, a printed circuit board 310, an optical sensor 330, a microcontroller 340, an internal nonvolatile memory 360, one or more batteries, and an infrared data (IrDA) emitter 145 for optical transfer of data from the scanner 110 by infrared communication.

The trigger switch 300 is disposed on and operatively coupled to the printed circuit board 310. The trigger switch 300 is positioned within the scanner 110 such that when the housing 109 is placed over the printed circuit board 310, the trigger button 112 is positioned to activate the trigger switch 300 when the trigger button 112 is depressed and released. The trigger switch 300 serves to activate operation of the scanner 110 and to initiate or perform scanning functions, decoding functions, storage functions and/or optical data transfer or communications/data transfer functions. In one embodiment, the trigger button 112 and the trigger switch 300 can be auto-discriminating between activating or initiating a scanning function and activating or initiating a communications/data transfer function.

As shown in FIG. 1, in one embodiment, the trigger button 112 and the trigger switch 300 are located in back of the optical scanning tip 113 to help to prevent the tip 113 from being obscured by a user finger or hand during use of the trigger button 112. In addition, the location of the trigger button 112 and the trigger switch 300 helps to prevent interference with the IrDA emitter 145 and the indicator LED 115.

The optical scanning tip 113 is disposed at a terminal end of the housing 109 and includes scanning means. In one embodiment, the scanning means of the tip 113 can include a scan lens 113a operatively connected to a scan light emitting diode (LED) 113b. The scan lens 113a is disposed at the terminal end of the housing 109 and configured to protrude externally from the terminal end to facilitate contact of the scan lens 113a with a surface for scanning.

The scan LED 113b is disposed posterior to the scan lens 113a. In one embodiment, the scan LED 113b includes a 660 nm LED and is configured to generate a scanning light 114 to reflect upon a bar code or other information symbol the scanning tip 113 contacts to facilitate scanning of the bar code symbol. The scan LED 113b can also provide visual LED feedback to a user indicating the status or mode of operation of the scanner 110. In one embodiment, the scan LED 113b can be configured to emit or flash the scanning light 114 as a steady or flashing light 114 and/or a bright or dim light 114 for certain periods of time or at a certain rate to indicate, for instance, the status of the scanner 110 and/or the action being performed.

The scan LED 113b is operatively connected to the printed circuit board 310 and thereby operatively coupled to the trigger switch 300 such that activation of the trigger switch 300 activates operation of the scan LED 113b. For instance, to initiate scanning, the trigger button 112 is depressed and released to activate the trigger switch 300, which thereby activates the scan LED 113b to emit the light 114. The scan LED 113b is coupled to the scan lens 113a such that the scan lens 11a helps to facilitate emission of the light 114 from the scanner 110 and helps to direct the light 114 to a surface or bar code symbol when the scan lens 113a contacts the surface or bar code symbol for scanning. The scan lens 113a is further configured to permit light rays, or a returning portion of the light 114 reflected by a surface or bar code symbol during scanning, to pass through the lens 113a into the scanner 110 for detection by the sensor 330.

Referring further to FIG. 2, the optical sensor 330 is operatively connected to the printed circuit board 310, and is constructed and arranged to detect reflected light rays of the light 114, which the scan LED 113b emits during scanning to reflect on a surface or bar code symbol. As described above, during scanning the scan LED 113b emits the light 114 through the scan lens 113a for projection along a bar code symbol when the lens 113a contacts the bar code symbol and the scanner 110 is swiped or dragged across the symbol. At least some portion of the light rays of the scanning light 114 is reflected by the bar code symbol. The sensor 330 is disposed and configured to detect reflected light rays during scanning and is further configured to generate, in response to detection of such reflected light rays, an electrical signal that corresponds to or is indicative of the reflected light rays. The electrical signal can represent a configuration of the scanned bar code, e.g., total number of bars and/or length and width of bars. The sensor 330 is further configured to transmit the electrical signal to the microcontroller 340.

The microcontroller 340 is operatively connected to the printed circuit board 310, and is configured to carry out signal conditioning and adaptive thresholding by firmware residing in the memory 360 such that there is no external signal conditioning circuitry disposed outside of the microcontroller 340. The microcontroller 340 includes a decoder integrated circuit (IC) 370 and a microprocessor 350.

The decoder IC 370 is operatively connected to the sensor 330 and the microprocessor 350, and is configured to receive electrical signals the sensor 330 transmits to the microcontroller 340 during scanning. The decoder IC 370 is further configured to decode/convert electrical signals to decoded data e.g., digital data, for storage in the memory 360 and/or for optical transfer from the scanner 110.

Referring to FIG. 3, the configuration and operation of the decoder IC 370 is provided by and managed through hardwire connections and firmware commands provided by applications software residing on the microprocessor 350 and by operation/control settings stored in the memory 360. The microprocessor 350 and the control settings of the memory 360 help to configure and to manage operations of the scanner 110 as a scan engine and to provide the capabilities for reading and for decoding/converting scanned bar code symbols, as well as other scanned symbols, codes and characters, including, for example, 12-digit, EAN, UPC, JAN bar codes and the like, as identified in Table I shown in FIG. 3.

In one embodiment, the scanner 110 is configured to enable and disable the control settings of the memory 360 by scanning and decoding parameter and/or control bar codes, e.g., numeric 2-digit Code 128 bar codes, such that decoded data provides instructions that enable or disable certain settings of the memory 360. For instance, control or parameter bar codes can be used to set one or more control settings of the scanner 110 that control an error checking function. With the error checking function set, the scanner 110 either can store a check digit, e.g., of a UPC and EAN code, in the memory 360 or can delete the check digit if, for instance, applications software recalculates the check digit. In another instance, the error checking function can permit the scanner 110 to ignore scanned codes and symbols without a valid check digit or to decode any recognized scanned codes and symbols. In further instances, one or more control settings of the scanner 110 permit the scanner 110 to ignore codes and symbols with less than a minimum specified number of characters, or permit the scanner 110 to recognize or ignore certain symbol and code extensions, e.g., UPC and EAN code extensions.

In one embodiment, the scanner 110 includes the decoder IC 370 configured and managed such that the decoder IC 370 can convert a scanned bar code symbol from one type/form to another equivalent, expanded or different type/form for storage in the memory 360 and/or for optical transfer from the scanner 110. For instance, the scanner 110 can be set such that the scanner 110 expands a valid scanned UPC-E bar code and stores it as a UPC-A bar code, or converts a valid EAN-8 code and stores it as an EAN-13 form by adding leading zeros. In other instances, the decoder IC 370 can be set to convert UPC codes to EAN forms, e.g., converting a valid UPC-A bar code and storing it as an EAN-13 form by adding a leading zero. In still further instances, the decode IC 370 can be set to convert a valid Bookland bar code and store it as an equivalent ISBN number by truncating the leading "978".

Those of ordinary skill in the art can appreciate that the invention is not limited to the scanner 110 having the operation/control settings and/or the decoder IC 370 configured for capabilities to decode/convert those codes and symbols as described above and as listed in FIG. 3. Rather, the invention anticipates that different embodiments of the scanner 110 can be configured with other operation/control settings and the decoder IC 370 can be configured to decode/convert different types of scanned bar code symbols and other scanned information symbols, codes and characters, in addition to those disclosed herein. The scanner 110 can be reset and/or reconfigured at a later date by reconfiguring or changing applications software and firmware commands of the microprocessor 350, and/or by enabling/disabling one or more of the operation/control settings of the memory 360, e.g., by enacting an "on"/"off" parameter that permits/prevents access to control bar code symbols and to the operation/control settings of the memory 360.

In addition, different embodiments of the scanner 110 according to the invention include the scanner 110 and the decoder IC 370 being configured to decode/convert special function codes and nonprintable characters to enable the scanner 110 to carry out different operations and functions. For instance, the decoder IC 370 can be configured to perform data management functions whereby data produced from decoding bar code symbols is retained in the memory 360 and/or optically transferred from the scanner 110. In other instances, the decoder IC 370 can be configured to decode diagnostic and test bar code symbols that test and troubleshoot operations and functions of the scanner 110.

In further embodiments, the decoder IC 370 can be configured to perform different functions during scanning and decoding operations to help to prevent error and/or to control accuracy of the scanner 110. For instance, in one embodiment, the decoder IC 370 can be configured such that if the sensor 110 transmits a second electrical signal as a result of a second scan of a single bar code symbol subsequent to transmitting a first electrical signal as a result of a first scan of the bar code symbol, the decoder IC 370, upon decoding the second signal can detect the second scan as a "duplicate" and can discard the decoded information related to the second scan. The decoder IC 370 is thereby configured to help to prevent the second or duplicate scan from being stored in the memory 360 and to prevent erroneous multiple scans of a single bar code symbol. In an alternative instance, if a user wants to use the scanner 110 to scan a single bar code symbol twice, the decoder IC 370 can be configured to decode both a first and a second electrical signal the sensor 330 transmits to the decoder IC 370 in response to detecting reflected light rays of a first and a second light 114. The decoder IC 370 can be further configured to accept and to store in the memory 360 the decoded information associated with the first and the second electrical signal.

In other embodiments, acceptance and rejection of duplicate scans or twice scanned bar code symbols can be handled by software residing on a computing device, e.g., a computer, a personal digital assistance or an interface device, to which the scanner 110 is operatively coupled for optical data transfer.

Referring further to FIG. 2, the scanner 110 further includes the nonvolatile memory 360, e.g., an electrically erasable and programmable read only memory (EEPROM), to store locally in the scanner 110 scanned and decoded data, and configurations and operation/control settings when the scanner 110 power is off or the scanner 110 is not activated. The memory 360 is configured and managed through firmware commands and can be configured to accommodate storage of a number of bar code symbols, e.g., approximately 300 retail bar codes, such as 12-digit, UPC and/or EAN bar codes or about 4096 bytes (4 k). Any decoded symbol that the decoder IC 370 decodes can be stored in the memory 360. The memory 360 can be further configured to retain decoded information associated with second bar codes until a user removes/erases the information from the memory 360. In one embodiment, the memory 360 can be configured to retrieve stored decoded information for optical data transfer by the scanner 110.

As described above, in one embodiment, the memory 360 can be configured by firmware to provide the various operation/control settings that dictate operations, parameters and functions of the scanner 100. The memory 360 can thereby include a customized configuration that includes fixed settings for certain operations, parameters and functions that cannot be modified, as well as field modifiable settings that can be customized or set by a user of the scanner 110 as certain operations, parameters or functions are required. Modifiable settings operate at certain default values unless a user of the scanner 110 accesses the settings through an access-rights function by enacting an "on"/"off" parameter. An "on"/"off" parameter can be enacted by using the scanner 110 to scan and decode a parameter and/or control bar code symbol the memory 360 recognizes to enable/disable the access-rights function.

In one embodiment, the fixed settings of the memory 360 can include at least one identification code that can identify an authorized or otherwise designated user of the scanner 110. The identification code is a non-modifiable setting that the scanner 110 can transfer from the memory 360 to identify a user of the scanner 110. In one embodiment, a computing device can be configured with applications software to recognize the identification code such that when the scanner 110 transfers the identification code to the computing device, the computing recognizes or identifies the user of the scanner 110. In one embodiment, the identification code is a unique identifier for a specific user of the scanner 110 similar to a personal identification number (PIN) and cannot be changed or altered. The fixed identification code can enable the scanner 110 to establish a communications data link between the scanner 110 and a computing device, as described below in further detail, such that the scanner 110 can transferred scanned bar code information to the computing device. In one embodiment, the identification code can prompt the computing device to provide to access other information the computing device processes and stores.

In other embodiments, the fixed settings of the memory 360 can configure certain parameters and functions of the scanner 110. Such fixed settings can include, but are not limited to, providing a serial identification number unique to the scanner 110 for transmitting or uploading to a computing device to record the number for identification and security purposes, providing a low battery indication that is displayed by an associated LED, providing an automatic clear function that clears certain codes, e.g., duplicate codes, automatically from the memory 360, setting a fixed scanning time once scanning is initiated, e.g., within certain ranges such as 10–150 units wherein each unit is equal to 0.1 seconds, and setting the maximum and the minimum lengths of bar code symbols the scanner 110 may scan, e.g., 1–20 units wherein each unit includes a certain number of characters.

Referring further to FIGS. 1–2, in one embodiment, the scanner 110 includes the IrDA emitter 145 configured to serve as a site for optical infrared data transfer from the scanner 110 to a computing device, e.g., a computer, a personal digital assistant, an Internet access or other interface component, equipped with a compatible infrared data (IrDA) receiver. In one embodiment, the IrDA emitter 145 is disposed at an end of the housing 109 opposite to the optical scanning tip 113. The IrDA emitter 145 is configured by applications software the microcontroller 340 uses to establish a wireless one-way infrared (IR) data link between the IrDA emitter 145 and a compatible IrDA receiver of the computing device. The IrDA emitter 145 includes a translucent or transparent "window" structure disposed in the housing 109 that is transmissive to infrared data streams the IrDA emitter 145 generates to transfer decoded data by infrared communication. The IrDA emitter 145 is configured such that when placed in close proximity to the IrDA receiver, and the scanner 110 is activated to data transfer mode, the IrDA emitter 145 provides a line-of-sight infrared data transfer to the IrDA receiver. The scanner 110 thereby transfers decoded bar code information to the computing device for user retrieval in a readable and useable format.

The scanner 110 further includes the one or more batteries 20 disposed within the housing 109 and operatively coupled to the printed circuit board 310 to provide power for operation of the scanner 110 in a wireless mode.

Stand-By and Scan Modes of Operation

As described above, to scan and capture a bar code symbol using the scanner 110, the trigger button 112 of the scanner 110 is manually depressed, e.g., by a user's finger, and then released. Depressing the trigger button 112 once and releasing it thereby activates the trigger switch 300 and places the scanner 110 in a stand-by mode. When the scanner 110 is in the stand-by mode, the scan LED 113b initially flashes brightly the red light 114 for a certain time, e.g., about 0.5 second, and then emits or shines the light 114 dimly. The dim light 114 indicates the scanner 110 is in a stand-by mode. The scanner 110 remains in the stand-by mode until the optical scanning tip 113 contacts a surface for scanning and the scanner 110, the sensor 330 and/or the microcontroller 340 detects the surface contacted is a reflective surface.

When the scan lens 113a is placed on a surface and the scanner 110/sensor 330 detects light reflected from the surface indicating that the surface is reflective, the scan LED 113b flashes the light 114 brightly for a certain time, e.g., about 2 seconds, or until the scanning tip 113 is removed from the surface, to indicate the scan LED 113b is going into a full-power state for scanning. Once the scan LED 113b flashes the light 114 brightly, the scan lens 113a can be placed in contact with the surface to the left or the right of a bar code symbol a user has selected for scanning. A user may then drag or swipe the scanning tip 113 to the left or to the right across the bar code in a substantially smooth and even motion to thereby scan the bar code symbol. The scan LED 113a continuously shines the light 114 brightly while the scanner 110 moves across the bar code symbol. The scanner tip 113 typically remains in contact with the surface until the scanner 110 has been dragged or swiped beyond a last bar of the bar code symbol in order that the scanner 110 scans and captures the full symbol.

When the selected bar code symbol has been completely scanned, the indicator LED 115 emits or flashes the green indicator light 116 one or more times to indicate that the scanner 110 has successfully scanned the bar code symbol. In one embodiment, if the scanner 110 did not successfully scan the selected bar code symbol, the indicator LED 116 takes no action and the indicator light 116 is not flashed.

In one embodiment, the scan mode initiated by activation of the trigger switch 300, as described above, can be time dependent whereby the scanner 110 can operate continuously or can operate intermittently to help to conserve battery power. To operate intermittently, the scanner 110 can be deactivated or shut down according to a user-defined parameter that deactivates or shuts down the scanner 110 after a certain period of time has elapsed subsequent to the trigger switch 300 activating the scanner 110 to the scan mode. After the user-defined period of time has expired, the trigger switch 300 automatically deactivates or releases and returns the scanner 110 to the stand-by mode. Automatically deactivating the scanner 110 and/or returning the scanner 110 to the stand-by mode helps to conserve battery power. In one embodiment, the user-defined parameter defining intermittent operation of the scanner 110 can include time intervals of from about 1 second to about 60 seconds. In a preferred embodiment, the scanner 110 is deactivated after about 20 seconds have elapsed subsequent to activation of the trigger switch 300.

In one embodiment, the scanner 110 can be configured such that when the trigger button 112 is continuously depressed, the microprocessor 350 detects the depression of the trigger button 112 and determines that the trigger button 112 is being depressed erroneously. The scanner 110 thereafter is deactivated to the stand-by mode or shut down. In one embodiment, the microprocessor 350 can be programmed to deactivate or to shut down the scanner 110 after detecting the trigger button 112 has been depressed continuously for a user-defined period of time. The microprocessor 350 deactivates the scanner 110 and returns the scanner 110 to the stand-by mode, or shuts down the scanner 110, after the user-defined period of time has elapsed. The scanner 110 can remain deactivated or shut down until the trigger button 112 is depressed again to reactivate the trigger switch 300.

Embodiments of the scanner 110 according to the invention can provide additional visual feedback via the indicator LED 115, as described above, to indicate the status and condition of different operations and functions of the scanner 110. For example, in one embodiment, if the scanner 110 has scanned an unauthorized code, e.g., a code that is not activated in the control settings of the memory 360, the indicator LED 116 flashes the green indicator light 116 rapidly following a scanning attempt to indicate a scan of an unauthorized code. The scanner 110, however, can recognize the code, but it does not properly decode and store the scanned code.

During use of the scanner 110, the indicator LED 115 can be configured to flash to indicate the extent of memory used. For instance, in one embodiment, the indicator LED 116 flashes the indicator light 116 once per second while in stand-by mode to indicate memory is close to full, e.g., 90% of a factory default equivalent to a certain number of bytes. In another embodiment, the indicator LED 115 indicates memory is full by flashing the indicator light 116 rapidly when a scan is attempted, and by flashing the indicator light 116 once per second when the scanner 110 is in the stand-by mode.

Optical Data Transfer

Scanned bar code information decoded by the scanner microcontroller 340 can be optically transferred from the microcontroller 340 and/or from the memory 360 by infrared communication using the IrDA emitter 145 of the scanner 110, as described above. The IrDA emitter 145 can transfer decoded data to a compatible infrared (IrDA) receiver operatively connected to a computing device, e.g., a computer, a personal digital assistant, an Internet access or other interface device. The computing device includes applications software to support infrared communications protocols of the scanner 110 and to configure the IrDA receiver to establish a one-way IR data link between the scanner 110 and the computing device, according to specified protocols of the scanner 110 and the computing device. The IrDA emitter 145 is placed in close proximity to the IrDA receiver to effect line-of-sight infrared data transfer. In one embodiment, the IR data link is initially established between the scanner 110 and the computing device by the IrDA 145 optically transferring to the IrDA receiver a user identification code fixed in the memory 360 of the scanner 110, as described above. Receipt of the identification code and recognition of the code by applications software of the computing device establishes an IR data link between the emitter 145 and the receiver. Optical transfer of decoded data from the scanner 110 to the computing device can then proceed.

In one embodiment, the trigger button 112 of the scanner 110 is depressed once and released to activate the trigger switch 300 and to place the scanner in stand-by mode from which the data transfer operation is initiated. The IrDA emitter 145 is placed within sufficient proximity of the IrDA receiver such that the IrDA receiver can capture a data stream the IrDA emitter 145 transmits by infrared communication. The trigger button 112 of the scanner 110 is depressed a second time to begin data transfer and remains depressed until the data transfer is complete. The IrDA emitter 145 emits a series of light flashes when the data transfer is complete, indicating the trigger button 112 can be released. In one embodiment, the scanner 110 is configured to attach and to transfer along with the infrared data stream a code that signals an end of the infrared transfer. The computing device receives the code and processes it accordingly. In one embodiment, the computing device can be configured in accordance with applications software to provide some indication of a successful and complete infrared data transfer.

Performance and other Specifications

Embodiments of the optical bar code scanner 110 according to the invention provide the scanner 110 with performance capabilities and functions as described below.

Interface Commands

The scanner 110 is configured to function within a range of scan velocities including, but not limited to, from about 2 inches to about 30 inches per second when the scanner 100 is positioned in a substantially perpendicular orientation to a surface and the scanning tip 113 is in contact with the surface.

The scanner 110 according to the invention operates over a range of tilt angles including, but not limited to, from about 0 degrees, e.g., the scanner 110 is positioned in a substantially perpendicular orientation to a surface, to about 30 degrees where the scanning tip is in contact with the surface. A field of depth at which the scanner 110 is capable of reading a bar code symbol includes a reading range of, but is not limited to, from about 0.010 inch (0.25 mm) of a standard symbol when the scanning tip 113 is within 0.012 inch (0.3 mm) of a surface and the scanner 110 is positioned in a substantially perpendicular orientation to the surface.

In addition, the scanner 110 according to the invention is capable of decoding selected symbologies having a Minimum Reflective Difference (MRD) of 50 percent at selected wavelengths of about 660 nm of the scan LED 115. The scanner 110 also operates at a minimum resolution of about 0.008 inches width of narrow bar or space determined at contact and normal operating conditions on news magazine quality paper stock and print. The scanner 110 is capable of decoding symbols on a range of surfaces including, but not limited to, loosely stacked newsprint of up to about 75 pages thick.

Figure 4:
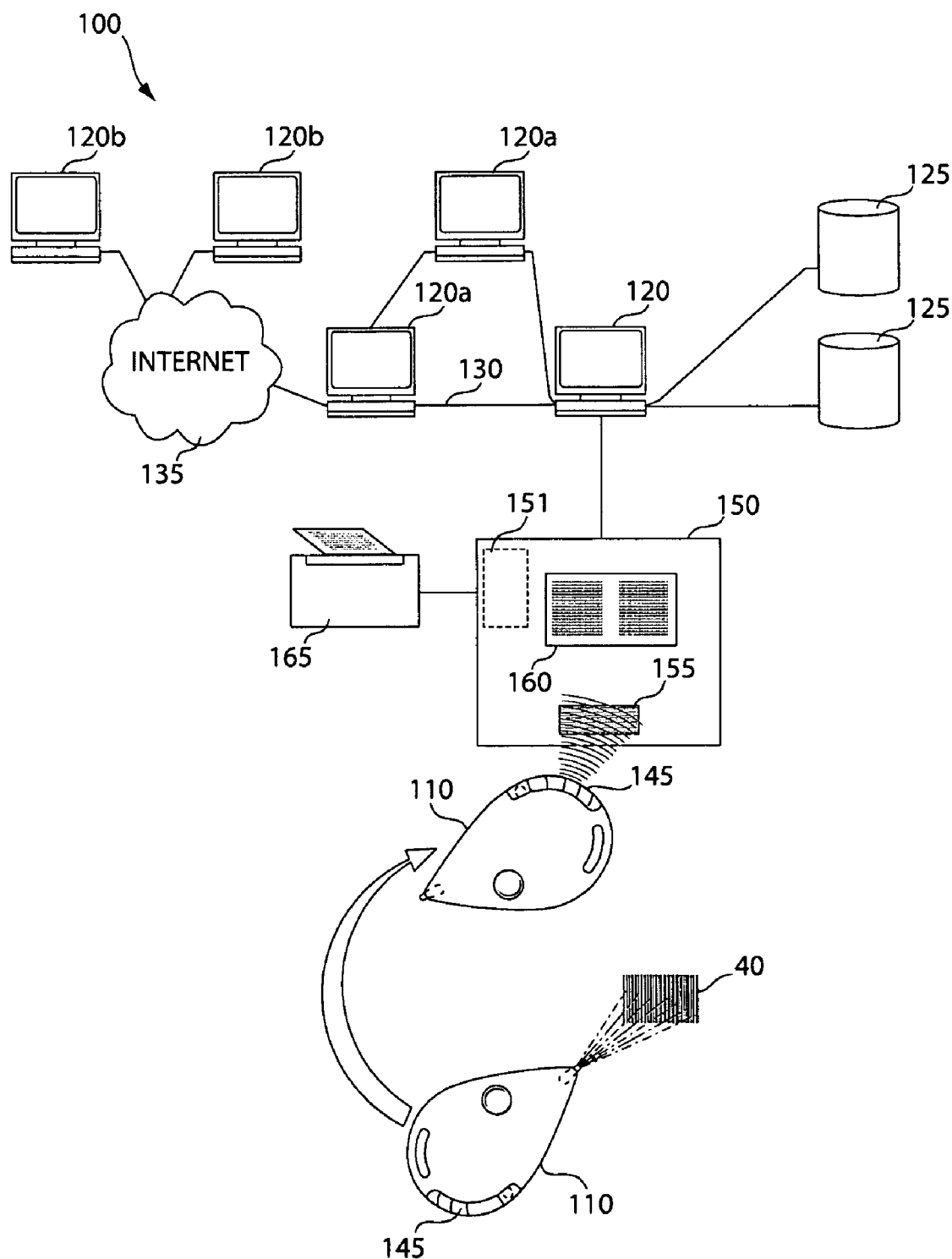
FIG. 4 is a schematic diagram of a system according to the invention for scanning decoding, storing, transferring and retrieving data captured and decoded from scanned bar code symbols shown in FIG. 3 using the scanner shown in FIGS. 1–2.

Referring to FIG. 4, the invention provides a system 100 for optically scanning and decoding bar code symbols, as well as other information symbols, codes and characters, and for transferring, receiving, formatting, storing and managing decoded data retrieved from scanned symbols, codes and characters. The system 100 includes the scanner 110, as described above with reference to FIGS. 1–3, at least a first host computer 120, a terminal 150 operatively coupled to the first host computer 120 to establish a communications link between the scanner 110 and the host computer 120, and, optionally, one or more databases 125 operatively coupled to the first host computer 120.

In one embodiment, the first host computer 120 includes, for instance, a PC-type computer configured with applications software to provide the host computer 120 with capabilities to receive, format, store and manage decoded data the scanner 110 optically transfers or uploads to the host computer 120 by infrared communication for retrieval of scanned bar code information. The host computer 120 can be further configured with applications software that enables the host computer 120 to process and to apply decoded data and other information in different operations and functions, e.g., data mining, and to process, display, store and manage decoded data and other information in a readable/useable format and as retrievable data files. In one embodiment, the host computer 120 is configured to download data files and other information to the terminal 150, which serves as an interface with a user of the scanner 110 and can provide access to data files and other information transmitted from the host computer 120.

In one embodiment, the first host computer 120 can operatively couple to multiple computers 120*a* of a LAN, an intranet or other distributed network 130 such that the host computer 120 can transmit decoded bar code data and other information through the network 130 for access to and use of such information at one or more sites. In another embodiment, the host computer 120 is one of multiple computers 120*b* operatively connected as a multi-user information and communications server or network 135, such as the Internet. In one embodiment, the host computer 120 is operatively connected to one or more of the databases 125 to provide storage and management of decoded data, as well as other information the host computer 120 processes and manages.

The terminal 150 is operatively coupled to the host computer 120 and serves to provide a wireless one-way communications data link between the scanner 110 and the host computer 120. In one embodiment, the terminal 150 is configured to serve as an access port by which the scanner 110 optically transfers or uploads decoded data to the host computer 120 and thereby enables the scanner 110 to communicate remotely to the host computer 120. In one embodiment, the terminal 150 includes a processor 151 that uses applications software to provide the terminal 150 with one or more functionalities to enable a user of the scanner 100 to interface with the terminal 150. The terminal processor 151 can use an application program to configure an infrared data (IrDA) receiver 155 to support infrared communications protocols of the scanner 110 such that the terminal 150 via the IrDA receiver 155 can capture infrared data streams the IrDA 145 of the scanner 110 transmits. The IrDA receiver of the terminal 150 and the IrDA emitter 145 of the scanner 110 effectively establish a line-of-sight infrared (IR) data link. The scanner 110 transfers data to the IrDA receiver 155 as described above in the section entitled Optical Data Transfer.

The terminal 150 is further configured to upload transferred decoded data to the host computer 120 for processing, formatting and/or storage. In one embodiment, the terminal processor 151 can use applications software to permit the scanner 110 to interface with the terminal 150 such that a user can employ the scanner 100 to access and to initiate and/or carry out different functions provided locally by the terminal 150, as described below in further detail.

The terminal 150 and/or the host computer 120 are further configured to provide decoded data transferred by the scanner 110 to the terminal 150 and/or to the host computer 120 in a readable and useable format. In one embodiment, the terminal 150 is configured to display transferred decoded data on a display monitor or screen 160 operatively connected to the terminal 150, e.g., having touch screen functions to interface a user of the scanner 110 with the retrieved data and with the terminal functions. In another embodiment, the terminal 150 is further configured to print transferred decoded data as printed text with a printer 165 operatively connected to the terminal 150. In either case, the terminal 150 enables a user of the scanner 110 to retrieve scanned bar code information the scanner 110 stores and transfers to the terminal 150.

The pocketsize and configuration of the scanner 110 permits a user to employ the scanner 100 as a portable data code collection, storage and transfer device for use in different locations, such as at home, in stores, in offices and other locations where bar code symbols, as well as other information symbols, codes and characters, are present. The scanner 110 can be used to scan a bar code symbol printed or affixed to various articles, such as, for example, consumer products, printed materials, packages/containers and the like. The scanner 110 scans, captures, decodes and thereafter stores the bar code symbol in the memory 360, as described in the section above entitled Stand-By and Scan Modes of Operation. The scanner 110 thereafter can transfer decoded data from the memory 360 to the terminal 150 by an IR data link established between the IrDA emitter 145 to the IrDA receiver 155 for retrieval of scanned bar code information in a readable/usable format as displayed or printed text.

As described above, the scanner 110 is configured and managed by firmware that provides a number of fixed settings in the memory 360 that cannot be modified by a user, and includes at least one fixed identification that serves as a personal identifier to identify a specific authorized or designated user of the scanner. When the scanner 110 transfers or uploads the personal identification code to the terminal 150 and/or the host computer 120, applications software of the terminal 150 and/or the host computer 120 can recognize the identification code and thereby identify the user of the scanner 110 to the system 100. In one embodiment, the terminal 150 is configured such that where the IrDA receiver 155 captures the identification code transferred by the IrDA emitter 145 of the scanner 110, a one-way IR data link between the scanner 110 and the terminal 150 is established.

In one embodiment, when the host computer 120 recognizes an identification code, the host computer 120 provides an identified user with access to and use of other information the host computer 120 processes, manages and/or stores by displaying such information at the terminal display 160 or printing the information with the terminal printer 165. In one embodiment, the host computer 120 can be configured to respond to a recognized identification code by either downloading information to the terminal 150 to provide an identified user with local access to and use of the information, or can provide an identified user via the terminal 150 with a real-time, remote link to information residing with the host computer 120. In another embodiment, upon recognizing the identification code, the host computer 120 is prompted to retrieve stored data files and/or other information the host computer 120 processes, manages and/or stores with one or more of the databases 125. The data files and other information can be directly related to an identified user, or can be related to scanned bar code information an identified user has currently or previously transferred to the host computer 120. In addition, the data files and other information can be related to results of data management techniques and functions, e.g., data mining, the host computer 120 employs to process and to retrieve information targeted for an identified user.

In one embodiment, data files and other information can include personal data files related to an identified user that include, for instance, compilations or formatted sets of decoded data the identified user previously transferred to the host computer 120 with the scanner 110. Information provided by the host computer 120 in response to an identification code and/or scanned bar code information can include information useful and uniquely valuable to an identified user, and relevant to an identified user's interests and preferences. Different embodiments of the system 100 can configure the host computer 120 and/or the terminal 150 to respond to an identification code and transferred bar code information by providing any type of information that may be relevant to an identified user of the scanner 110.

Those of ordinary skill in the art can appreciate that different embodiments of the system 100 according to the invention can be designed and configured for use in different applications in which information symbols, codes and characters are scanned to capture and to retrieve information. The system 100 and the scanner 110 are particularly suitable for use in applications related to consumer products including, for instance, retail shopping, order processing and fulfillment, shipping and delivery, marketing and advertising, and inventory management. As provided below, the system 100 and the scanner 110 according to the invention are described in further detail in the context of retail shopping.

Figure 5:
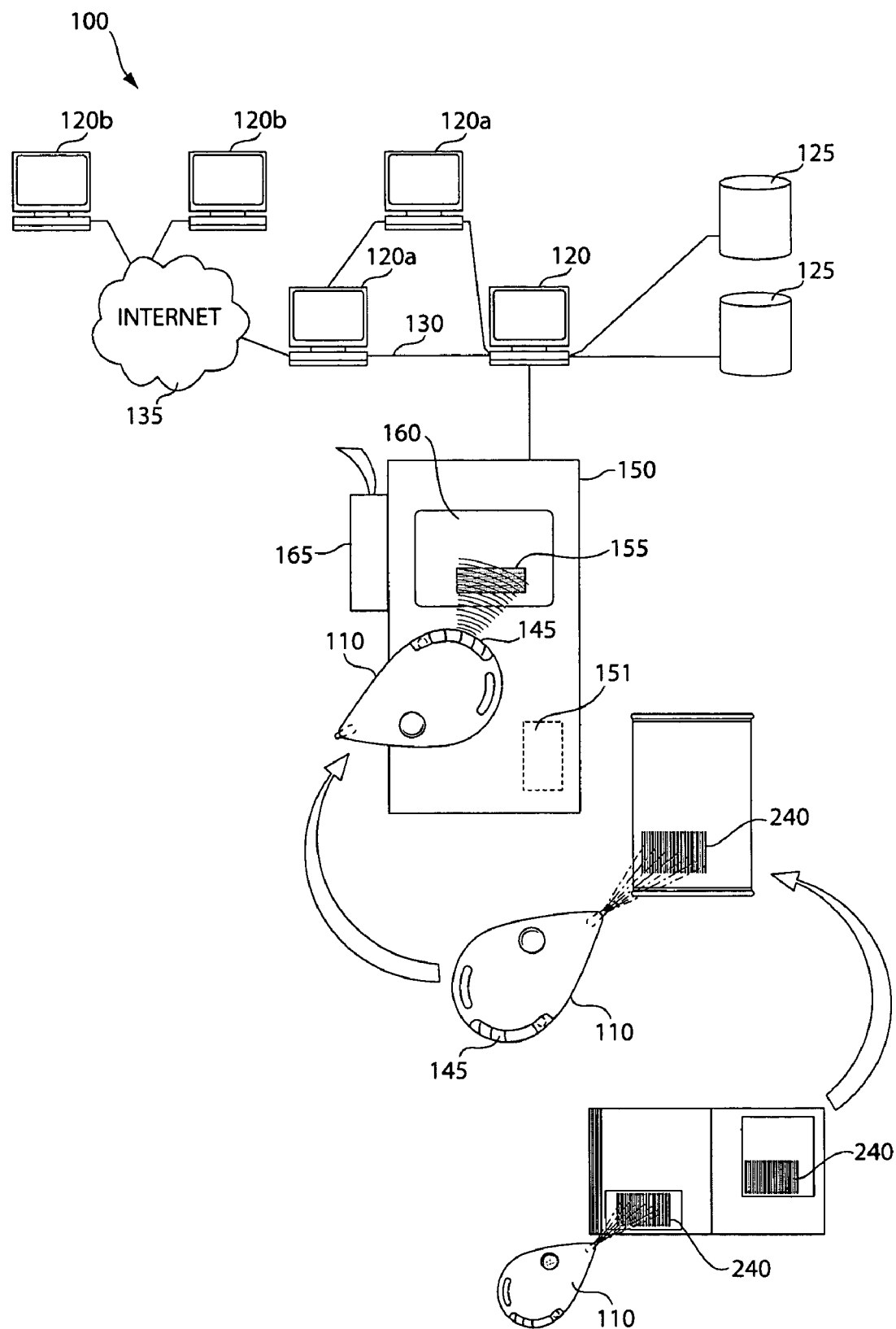
FIG. 5 is a schematic diagram of the system shown in FIG. 4 as applied to consumer shopping applications.

Referring to FIG. 5, in one embodiment, the invention provides the system 100 designed and configured for retail shopping applications and includes the scanner 110, as described above with reference to FIGS. 1–4. The scanner 110 serves as a personal shopping device to scan, decode and store bar code symbols associated with consumer products. The scanner 110 further serves to provide a user of the scanner 110 with decoded data in a readable and useable format such that the user can retrieve scanned bar code information as a displayed or printed text. The scanner 110 is used to optically transfer decoded bar code data to the terminal 150 and/or to the host computer 120, which, as described above, are configured to provide the transferred decoded data via the terminal display 160 and/or the terminal printer 165 in a format useful for shopping and for other consumer related purposes.

The scanner's 110 pocketsize and portability enable a consumer to use the scanner 110 as a mobile shopping device such that the consumer can use the scanner 110 in a variety of locations to scan, decode and store bar code symbols 240 printed on or affixed to selected goods/merchandise or product labels, tags and packaging. The scanner 110 can be further used to scan, decode and store bar code symbols 240 embedded in print advertisements, catalogs, promotional brochures, coupons, and other printed items. A consumer can use the scanner 110 to collect bar codes related to those items the consumer has selected to purchase or that the consumer would like to obtain additional information about.

For instance, in one embodiment, a consumer can use the scanner 110 at home or in a store to scan and decode bar code symbols 240 appearing on grocery and food item labels and packaging, as well as bar code symbols 240 printed on coupons. A consumer can then use the scanner 110 to optically transfer scanned bar code information to the terminal 150 and/or the host computer 120 for retrieval of decoded data in a readable and usable format. In one embodiment, the terminal 150 and/or the host computer 120, in response to receipt of transferred decoded data, can display or can provide a printed text, e.g., a shopping list, of the decoded data suitable for the consumer to use in shopping for the scanned items and for other shopping related activities. The scanner 110, as described above, is configured to capture and to decode bar code symbols 240 representing different types of product related information including, but not limited to, product names, item or model numbers, UPC codes, SKU numbers, pricing and location of items in a store.

In one embodiment, the system 100 includes the first host computer 120 alone or operatively coupled with multiple computers 120a of the LAN, intranet or distributed network 130 of a retailer. In one embodiment, the host computer 120 and the networked computers 120a can be located and operated at multiple sites or stores operated by the retailer. In one embodiment, the host computer 120 and the network 130 are operatively coupled to the Internet 135 to further configure the system 100.

In one embodiment, the terminal 150 is designed and configured as a portable or stationary shopping kiosk located at a retail site or store, such as a supermarket. The system 100 according to the invention anticipates multiple kiosks 150 distributed at a number of retail sites or stores, or other locations accessible to consumers. The shopping kiosk 150 is operatively coupled to the host computer 120 operated by the retailer such that the kiosk 150 and the host computer 120 establish a two-way communications link. The shopping kiosk 150 is further configured to provide the scanner 110 with an access port to the host computer 120 via the IrDA receiver 155 such that the scanner 110 can optically transfer decoded bar code data to the kiosk 150 by infrared communication for upload to the host computer 120. In one embodiment, the kiosk 150 is configured to upload transferred decoded data to the host computer 120 in real-time. In another embodiment, the kiosk 150 is further configured with local memory to store transferred data for later use during shopping and other activities and/or for later upload to the host computer 120 for storage.

In one embodiment, as described above, a consumer can use the scanner 110 to transfer an identification code from the IrDA emitter 145 to the kiosk IrDA receiver to establish an IR data link upon recognition of the identification code by the kiosk 150 or the host computer 120. Once the link is established, the consumer can use the scanner 110 to transfer decoded data to the kiosk 150 by infrared communication. The kiosk 150 thereby retrieves transferred decoded data by displaying data, for example, as a shopping list on the kiosk display 160 and/or by printing data with the kiosk printer 165.

A consumer can then use the kiosk-generated shopping list for a variety of purposes including, but not limited to, locating and selecting items in a store, uploading the shopping list via the kiosk 150 to the host computer 120 for storage of the shopping list as a retrievable data file for future access and use, uploading the shopping list via the kiosk 150 to the host computer 120 for distribution of the shopping list through the network 130 to a second retail site or store, e.g., for order fulfillment and pick-up by the consumer at the second site or store.

In one embodiment, the host computer 120 can be configured such that receiving scanned bar code information from the kiosk 150 prompts the host computer 120 to download to the kiosk 150 for consumer access and use additional information related to the scanned grocery and food items. Such information can include, but is not limited to, pricing information, special offers, discounts and rebates, product features and benefits, nutritional information, product availability and location, and other products similar or related to the scanned items. In one embodiment, the host computer 120 can be configured such that in response to receiving decoded data captured from scanning bar-coded coupons, the host computer 120 electronically redeems coupon discounts, e.g., by downloading discount information to the kiosk 150. In another embodiment, the host computer can be configured to manage a retailer-sponsored loyalty program whereby the host computer 120, in response to receiving scanned bar code information, is prompted to distribute and record electronically rewards a consumer has earned through the loyalty program. The host computer 120 can administer such a loyalty program through the kiosk 150 by displaying and/or printing for consumer access up-to-date information, e.g., about rewards earned or redeemed, grocery and food items subject to special rewards, and other specials and discounts offered as loyalty program incentives.

In another embodiment, the host computer 120 can be configured to respond to the identification code a consumer optically transfers with the scanner 110 to the kiosk 150 and/or the host computer 120. The host computer 120 can be configured with applications software such that upon recognition of the consumer's identification code, the host computer 120 retrieves personal data files related to the identified consumer and/or bar code information the identified consumer previously uploaded to the host computer 120. The host computer 120 can also retrieve, e.g., from one or more of the databases 125, other information, processed, managed and stored by the host computer 120 related to the scanned grocery and food items and other products and services that may be of interest and use to the identified consumer. The host computer 102 can download the personal data files and other information to the kiosk 150 for access and use by the consumer.

In one embodiment, personal data files the host computer 120 processes, manages, and/or stores can be based upon scanned bar code information currently uploaded and previously uploaded by a consumer using the scanner 110 during prior shopping activities. The personal data files can include, for instance, personal buying histories indicating a consumer's previous purchases of scanned items, product descriptions of scanned and related items as well as information about product preferences of the consumer based upon past buying habits and requests for product information, as identified, at least in part, by the scanned bar code information uploaded by the consumer with the scanner 110. The host computer 120 can also administer and manage via the kiosk 150 consumer access to and participation in customer loyalty programs, targeted sales and marketing programs and other sales and promotional programs tailored to the consumer's preferences and interests based on the consumer's personal buying histories.

In another embodiment, upon recognition of a consumer identification code, the kiosk 150 and/or the host computer 120 can be configured to provide the identified consumer with access to and use of local functions of the kiosk 150 configured by the processor 151. In one embodiment, the kiosk 150 can be configured with the processor 151 functionalities that permit, for instance, an identified consumer to compose a product order using the shopping list displayed by the kiosk display 160 whereby touch screen functions enable the consumer to select items from the displayed shopping list and to thereby format a product order. The kiosk printer 150 can provide a printed copy of the product order. The kiosk 150 can be further configured with functionalities to enable the consumer to transmit the formatted product order from the kiosk 150 to the host computer 120 for order fulfillment and delivery, e.g., at a designated retail site or store. For instance, the host computer 120 can transmit the product order to the retail site or store at which the consumer is located for order fulfillment and delivery of the order to the consumer at that site. Alternatively, the host computer 120 can transmit via the LAN, intranet or distributed network 130 the product order to a second computer 120a located at a second retail site or store remote from the host computer 120 for fulfillment and delivery to the consumer at the second site or store. In another instance, operatively coupled to the Internet 135, the host computer 120 can transmit the product order to a different retail site or store, or to a different retailer, via the Internet 135.

The system 100 according to the invention is not limited with respect to the configuration and functions of the kiosk 150 and the host computer 120, and anticipates the kiosk 150 and/or the host computer 120 can be configured with different types of applications software to provide a consumer with access to and use of different functions of the kiosk 150 and/or the host computer 120, as well as information managed and stored by the host computer 120. For instance, through a connection operatively coupling the host computer 120 with the Internet 135, an application program used by the processor 151 to interface and connect the kiosk 150 to the Internet 135 can configure the kiosk 150. The kiosk 150 can thereby provide an identified consumer with access to online web sites. In response to the kiosk 150 and/or the host computer 120 recognizing an identification code associated with a consumer, the kiosk 150 can provide the identified consumer with access to one or more web sites related to the scanned grocery and food items, as well as other related websites or websites that may be of interest to the identified consumer. In one embodiment, the web sites the kiosk 150 provides access to can be related to the decoded data stored by the kiosk 150 and/or the host computer 120.

Different embodiments of the invention can configure and arrange the system 100 and the scanner 10 to provide a consumer with access to and use of different types of product related and consumer information in response to the scanned bar code information and/or the identification code the consumer optically transfers to the system 100 using the scanner 110. In this respect, the invention is not limited and anticipates the system 100 and the scanner 110 can not only provide a system for retrieving scanned bar code information, but also can provide a system for storing and managing such information in meaningful and useable ways.

Figure 6:
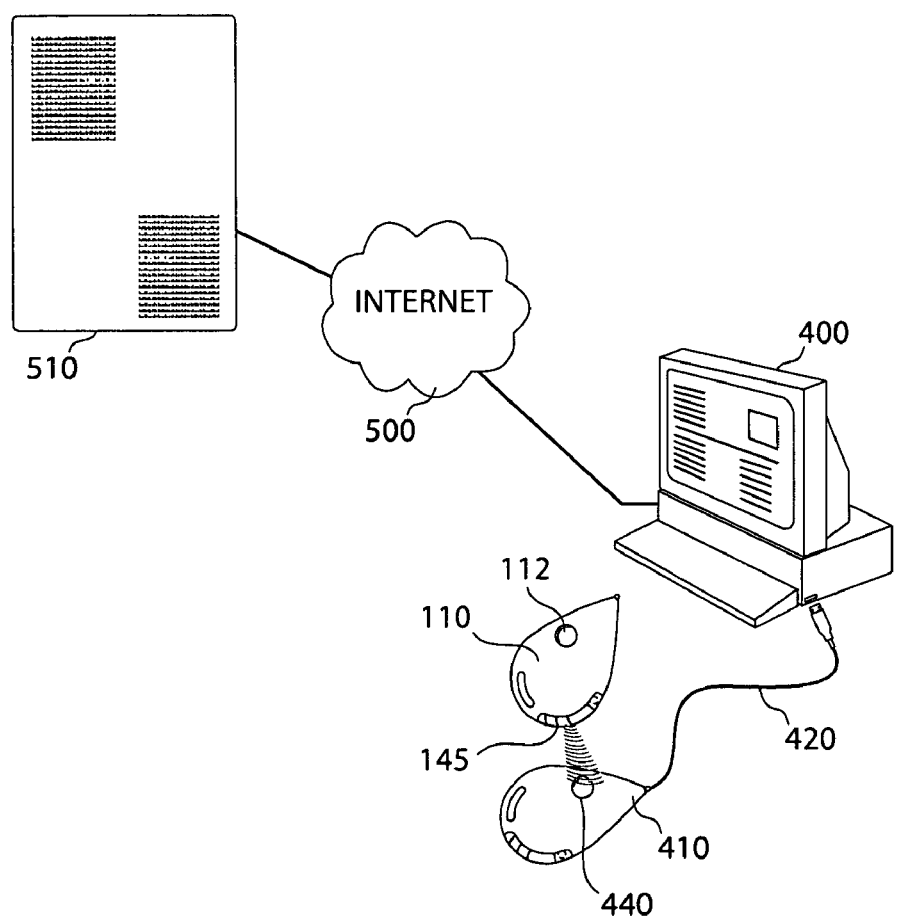
FIG. 6 is a schematic diagram of the scanner shown in FIGS. 1–2 used in combination with a personal computer.

Referring in FIG. 6, the scanner 110 as described above with reference to FIGS. 1–3 can be used to scan, capture, decode, store and optically transfer scanned bar code information to a personal computer or an Internet access device 400. In one embodiment, the personal computer 400 is operatively coupled to a wireless infrared (IR) data linking station 410 and is configured with applications software to support infrared communications protocols of the scanner 110 to thereby configure compatibility of the IR data linking station 410 with the scanner 110 to provide decoded data transfer by infrared communication. The IR data linking station 410 includes an IrDA receiver 440 compatible with the IrDA emitter 145 of the scanner 110. The IrDA receiver 440 can capture infrared data streams the scanner 110 transmits from the IrDA emitter 145 via line-of-sight infrared communication. The IR data linking station 410 is operatively coupled to the personal computer 410 via a communications connection or cable 420, e.g., as provided by an asynchronous serial RS232/D8 connection, a Universal Serial Bus (USB) connection or equivalent connection.

As described above in the section entitled Optical Data Transfer, the trigger button 112 of the scanner 110 is depressed once and released to activate the scanner 110 and to place the scanner 110 in the stand-by mode. Upon placing the IrDA emitter 145 of the scanner 110 proximate to the IrDA receiver 440 of the IR data linking station 410, the trigger button 112 is depressed a second time to initiate an optical transfer of decoded data from the scanner 110 to the personal computer 400 via the IR data link established between the IrDA emitter 145 and the IrDA receiver 440. The transferred data is thereby uploaded to the personal computer 400, which can immediately display the decoded data for use, and/or can store the data future access and use.

The combination of the scanner 110 and the personal computer 400, as shown in FIG. 6, offer similar consumer conveniences and ease in shopping applications, as described above. In one embodiment, a consumer can use the scanner 110 to capture and store bar code symbols, e.g., on grocery and food item labels and packaging while at home and can generate a shopping list of such items by uploading decoded data from the scanner memory 360 to the personal computer 400 via the IR data link 410. The personal computer 400 can provide the decoded data as a displayed or printed readable/useable output or a shopping list for the consumer to use and/or to store with the personal computer 400 for later use. As described above, the shopping list can include various product related information associated with the scanner grocery and food items.

In one embodiment, a consumer can use the personal computer 400 to compose and to generate a product order from decoded bar code data uploaded to the personal computer from scanner 110. In one embodiment, the personal computer 400 can display and/or print the decoded data as a shopping list from which the consumer can compose and format a product order, e.g., including product names, item SKU numbers, pricing and aisle locations of the items in a store. The consumer can use the personal computer 400 to generate the product order as a displayed or printed order. In one embodiment, where the personal computer 400 is operatively connected to the Internet, the consumer can transmit the product order as a text message or an email message via the Internet 135 to a selected vendor for order fulfillment. The consumer can then pick-up the fulfilled product order at a designate site or store location of the selected vendor.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A shopping system for scanning codes related to products and for retrieving data associated with the codes, the shopping system comprising:

a battery-operated personal code scanner having a size and a shape such that the scanner is hand-held, the scanner including a light source for projecting a light from the scanner to the code to be scanned, an optical sensor for detecting light reflected from the code and for generating an electrical signal in response to detecting the reflected light, a microcontroller for decoding the electrical signal to decoded data, memory operatively coupled to the microcontroller for storing the decoded data and at least one identification code to identify a user of the scanner, the identification code being unique to the scanner and a user, and an infrared emitter operatively coupled to the microcontroller for transferring the identification code and the decoded data from the scanner by infrared communication;

at least a first shopping kiosk for receiving the decoded data from the scanner including a processor and an infrared receiver, the infrared receiver being configured by an application program used by the processor to enable the infrared receiver to receive the identification code by infrared communication and, upon the processor recognizing the identification code, to establish a communications data link with the scanner such that the infrared emitter can transfer the decoded code to the infrared receiver; and at least a first host computer operatively coupled to the first shopping kiosk, the first host computer and the first shopping kiosk being configured to enable a two-way communications link between the first host computer and the first shopping kiosk, the first host computer including a processor and memory, the processor being configured with one or more application programs to receive the decoded data from the first shopping kiosk through the communications link and to identify information related to the decoded data, wherein, in response to identifying the information related to the decoded data, the processor selects and retrieves stored information from the memory and transmits the retrieved information to the first shopping kiosk through the communications link, and the first shopping kiosk provides the retrieved information in a useable format.

2. The system of claim 1, wherein the retrieved information includes at least one of pricing information, product features and benefits information, nutritional information, special offer information, location information, delivery information, related and similar products information, information related to decoded data the first host computer previously received, and any combination thereof.

3. The system of claim 1, wherein the first shopping kiosk further includes means for providing the decoded data transferred from the scanner in a useable format.

4. The system of claim 3, wherein the first shopping kiosk further includes means for providing the retrieved information transmitted from the first host computer in a useable format.

5. The system of claim 4, wherein means for providing one of the transferred decoded data and the retrieved information in a useable format includes a printer operatively coupled to the first shopping kiosk to provide at least one of the transferred decoded data and the retrieved information in a readable format as printed text.

6. The system of claim 4, wherein means for providing one of the transferred decoded data and the retrieved information in a useable format includes a display monitor operatively coupled to the first shopping kiosk to provide at least one of the transferred decoded data and the retrieved information in a readable format as displayed text.

7. The system of claim 1, wherein the first shopping kiosk further includes memory to store the transferred decoded data.

8. The system of claim 7, wherein the processor of the first shopping kiosk is further configured to provide the transferred decoded data in a useable format in response to identifying the identification code.

9. The system of claim 1, wherein the processor of the first host computer is further configured with one or more application programs to receive the identification code from the first shopping kiosk through the communications link, and to identify a user associated with the identification code.

10. The system of claim 9, wherein the processor of the first host computer is further configured such that, in response to identifying a user associated with the identification code, the first host computer selects and retrieves stored information associated with the identified user from the memory and transmits the retrieved information to the first shopping kiosk through the communications link, and the first shopping kiosk provides the retrieved information in a useable format.

11. The system of claim 10, wherein the retrieved information associated with the identified user includes at least one of information describing the user's personal buying history, information related to the user's preferences, information related to the user's product selections, information related to products similar to the user's product selections, and any combinations thereof.

12. The system of claim 10, wherein the first host computer is operatively coupled to one or more databases configured to store and to manage at least one of the information related to the decoded data and the information associated with the identified user.

13. The system of claim 1, wherein the first shopping kiosk is operatively coupled to a local area network of multiple shopping kiosks.

14. The system of claim 13, wherein the processor of the first shopping kiosk is further configured to transmit the decoded data transferred from the scanner through the local area network to a second shopping kiosk, wherein the second shopping kiosk receives the decoded data and provides the decoded data in a readable format.

15. The system of claim 13, wherein the first host computer is operatively coupled to the local area network and its processor is further configured to transmit the decoded data transferred from the first shopping kiosk through the local area network to one or more shopping kiosks.

16. The system of claim 15, wherein the local area network is operatively connected to the Internet, and at least one of the processor of the first shopping kiosk and the processor of the first host computer is further configured to transmit decoded data through the Internet to a second host computer.

17. The system of claim 16, wherein the processor of the first shopping kiosk processor is further configured to provide one or more local functions to the first shopping kiosk to permit user access to the decoded data transferred from the scanner to the first shopping kiosk.

18. The system of claim 17, wherein the one or more local functions of the first shopping kiosk permit a user to format the decoded data into a product order and to transmit the product order from the first shopping kiosk through the Internet to the second host computer for order fulfillment.

19. The system of claim 1, wherein the identification code includes information related to at least one of the user and the scanner.

20. The system of claim 1, wherein the scanner is further configured having a size and a shape to serve as a key fob.

21. The system of claim 1, wherein the scanner further comprises a manually operated trigger disposed in the housing and configured to activate the scanner to perform one or more functions.

22. The system of claim 1, wherein the scanner further comprises a lens disposed in the housing with at least a portion of the lens protruding from a terminal end of the housing to permit the portion of the lens to serve as a contact scanning tip, the lens being further disposed and being configured to permit light generated by the light source to shine from the scanner and to receive light reflected from the code.

23. The system of claim 1, wherein the scanner further comprises an indicator light disposed in the housing and configured with a light source to generate one of a static light beam and a flashing light beam to indicate one or more functions of the scanner.

24. The system of claim 1, wherein the microcontroller is further configured to use an application program stored in the memory to enable the scanner to decode one or more types of codes in response the microcontroller decoding a scanned control code associated with instructions to decode the one or more types of codes.

25. The system of claim 1, wherein the microcontroller is further configured to use an application program stored in the memory to enable the scanner to perform one or more functions in response to the microcontroller decoding a scanned setting code associated with instructions to perform the one or more functions.

26. The system of claim 25, wherein the one or more functions of the scanner includes the scanner providing an indication a code was scanned twice.

* * * * *